Patented Feb. 14, 1950

2,497,610

UNITED STATES PATENT OFFICE 2,497,610

PROTEIN PRESERVATIVE

Reginald W. Ivett, Wilmington, Del., assignor to Hercules Powder Company, Wilmington, Del., a corporation of Delaware No Drawing. Application December 26, 1947, Serial No. 794,113

8 Claims. (Cl. 106—146)

This invention relates to the preservation of solutions containing putrefactible materials and more particularly to aqueous solutions or dispersions of proteins preserved from putrefaction by the addition of a stabilized rosin amine.

Aqueous solutions or dispersions of proteins have many industrial applications but these materials are subject to putrefaction and, consequently, cannot be stored for any length of time without the destruction of the complex protein molecule and the development of foul odors. Both animal and vegetable proteins are used in the form of aqueous solutions or suspensions in such coating compositions as water-base and paste protein paints and adhesives and in textile sizings and finishes for imparting body and hand to the fabric. These protein solutions are subject to spoilage by the action of both bacteria and enzymes, the protein molecule undergoing hydrolysis, deaminization, decarboxylation, etc. As a result of this putrefactive action, the solutions become foul-smelling due to the formation of mercaptans, etc., and lose their viscosity because of the breakdown of the protein molecule. For example, an important problem in the production of protein paints is the tendency of these paints to become thinner upon storage and finally to become so liquid that the pigments and inert fillers originally suspended therein separate and settle to the bottom of the container. Various preservatives have been suggested for use in aqueous protein solutions in an attempt to prevent putrefaction but these prior art preservatives have been either highly odorous compounds which cannot be used for many applications or they have been volatile compounds such as toluene and chloroform.

Now in accordance with this invention it has been found that aqueous solutions or dispersions of proteins may be preserved by the addition of a stabilized rosin amine or a salt thereof. The rosin amine prevents the growth and deleterious action of microorganisms and, as a result, the protein molecule is not degraded by the microorganisms and, thus, the viscosity of such solutions or dispersions is not decreased by putrefaction. The use of a rosin amine as a preservative for these solutions has the additional advantage of being odorless and consequently contributing no odor to the solution and, at the same time, preventing the formation of an unpleasant odor due to the putrefaction of the material. Also advantageous is the fact that the rosin amines are very light in color and when used to preserve protein solutions prevent the darkening of the protein which normally occurs on aging.

The following examples illustrate the preservation of aqueous protein materials by the addition of a stabilized rosin amine or salt thereof. All parts and percentages are by weight unless otherwise indicated.

Example 1

A 10% ammonium caseinate solution was prepared by soaking 30 parts of casein in 264 parts of water at 50° C. for 15 minutes and then stirring in 3 parts of 28% ammonium hydroxide. Agitation was continued until a smooth homogeneous solution or dispersion was formed. Dehydrogenated rosin amine was added to portions of this solution and the solutions were then exposed to the atmosphere and compared with a portion to which no preservative was added. The solution to which 1% (based on the weight of casein present) of the dehydrogenated rosin amine was added was still stable and homogeneous at the end of 90 days, when the experiment was discontinued, whereas a control sample of the caseinate solution to which no preservative was added putrefied in 3 days. The odor of the preserved solution did not change perceptibly but remained that typical of fresh ammonium caseinate during the 90-day observation period.

Example 2

A 10% ammonium caseinate solution was prepared as described in Example 1 except that less ammonium hydroxide was used, the smooth solution being formed at a pH of 7.5. To samples of this solution were added 0.5% and 0.25% (based on the weight of casein present) of hydrogenated rosin amine acetate and the solutions were exposed to the air. A control sample to which no preservative was added putrefied in 6 days, whereas the solutions containing 0.5% and 0.25% of the rosin amine preservative were still stable at the end of 24 days.

Example 3

A protein paint of the following formulation was prepared:

| | Parts |
|---|---|
| Titanium dioxide | 54 |
| Whiting | 135 |
| China clay | 81 |
| 15% aqueous ammonium caseinate | 200 |

After mixing and grinding on a burrstone mill, the formula was used as a paste paint and diluted to 15% solids for use as a thin paint.

To increments of both the paste and thin paints were added 2% and 4% dehydrogenated rosin amine acetate and 2% and 4% of dehydrogenated rosin amine stearate. Unpreserved samples of the paste and thin paints putrefied in 2 to 4 days. A comparison of the preserved and unpreserved paints is given in the following table:

|  | Days Effective | |
| --- | --- | --- |
|  | Thin Paint | Paste Paint |
| no preservative | 2 to 4 | 2 to 4 |
| 2% dehydrogenated rosin amine acetate | 39 | 48+ |
| 4% dehydrogenated rosin amine acetate | 48+ | 48+ |
| 2% dehydrogenated rosin amine stearate | 48+ | 48+ |
| 4% dehydrogenated rosin amine stearate | 48+ | 48+ |

Any stabilized rosin amine or salt thereof may be used as a preservative for proteins in accordance with this invention. These preservatives are particularly effective for preventing the putrefaction of aqueous solutions or dispersions of the proteins. The rosin amines are effective for preserving either animal or vegetable proteins as, for example, casein, egg or blood albumen, soy bean, peanut, cottonseed, or corn protein, gelatin, etc.

The protein which is treated with the stabilized rosin amine is usually dissolved or suspended in water, since it is these aqueous materials which are most subject to putrefaction, there being little or no putrefaction in the anhydrous material. However, the rosin amine may be added to the dry protein to prevent any putrefaction which may occur due to the presence of moisture. By adding a stabilized rosin amine, or salt thereof, to aqueous solutions or dispersions of proteins, the putrefaction of these materials is prevented. For example, in protein paints the rosin amine compounds effectively prevent putrefaction and consequently the paint may be stored without developing a foul odor or becoming so thin that the pigments and inert fillers separate. The addition of a rosin amine to a protein solution used for impregnating textile materials as in sizing and waterproofing is also important. In such applications as paper coating and in glues where aqueous protein solutions are used, putrefaction must be prevented and the rosin amines are effective for this purpose. Wherever the protein solution or dispersion is used in contact with air so that it becomes inoculated with bacteria, the decomposition and development of odor due to putrefaction is prevented by the addition of a stabilized rosin amine.

Any stabilized rosin amine or salt thereof may be used as the preservative for protein materials. The rosin amines which may be used are the amines of stabilized rosins, such as those of dehydrogenated or disproportionated rosin, polymerized rosin, or hydrogenated rosin. If desired, the amines of the pure resin acids, such as dehydroabietylamine, hydroabietylamine, etc., may be used. By the term "stabilized rosin amine" is meant a rosin amine having the ring structure of a stabilized rosin acid, such as dehydroabietic acid, dihydroabietic acid, tetrahydroabietic acid, polyabietic acid, or a mixture of such rosin amines.

The stabilized rosin amines used as preservatives in accordance with this invention may be prepared by reacting ammonia with a stabilized rosin to form the nitrile and then hydrogenating the nitrile to form the amine. The preparation of the nitrile may be carried out by passing gaseous ammonia into the molten rosin material and vaporizing the water as fast as it is formed in order to remove the water from the reaction mixture. The nitrile may also be prepared by heating the rosin material with ammonia in the presence of a dehydration catalyst. In either case, the nitrile should be purified by neutralization or distillation before subjecting it to hydrogenation to prepare the amine, as the presence of acidic materials frequently deactivates the hydrogenation catalyst.

The resin acid nitriles prepared from the stabilized rosins are then hydrogenated to prepare the amine. The hydrogenation may be carried out in the presence or absence of ammonia. Likewise, a solvent may be used in the reaction but is not necessary. Any active hydrogenation catalyst may be used as, for example, an active base metal catalyst such as nickel, cobalt, Raney nickel, Raney cobalt, etc., a noble metal catalyst such as active platinum, palladium, palladium on carbon, or reduced platinum oxide. The reaction is usually carried out at a pressure of from about 200 to 8000 pounds per square inch and at a temperature of from about 20° C. to about 200° C.

The stabilized rosin amines may also be used in the form of their salts. The salts are readily prepared by adding an acid of the desired anion to the rosin amine either in the presence or absence of a solvent for the reaction. In some cases the salts are more easily prepared by a metathesis reaction between a rosin amine salt, such as the acetate, and a suitable alkali metal salt. As examples of the salts of rosin amines, which may be used in accordance with this invention, may be mentioned the hydrochloride, hydrobromide, phosphate, sulfate, borate, oxalate, formate, acetate, chloroacetate, bromoacetate, propionate, chloropropionate, butyrate, oleate, laurate, stearate, benzoate, salicylate, phthalate, resinate, naphthenate, etc., and the metal complex salts of the amines.

The stabilized rosin amine or salts thereof may be incorporated with the protein material in any convenient manner. In adding the amine itself or a water-insoluble salt of the amine to an aqueous solution or dispersion of a protein, it may be desirable to dissolve the rosin amine in a water-miscible solvent such as alcohol or acetone in order to insure uniform distribution of the rosin amine in the aqueous phase. However, if sufficient agitation is used, the amine can be incorporated without the use of an organic solvent. In the case of the water-soluble salts of the rosin amines, the salt may readily be dissolved directly in the aqueous phase.

The amount of the stabilized rosin amine or salt thereof to be added to the protein material depends upon the degree of preservation desired. For example, when preservation is required for only short periods of time, up to about 15 days, 0.25% to 0.5% of rosin amine based on the amount of protein is sufficient. For longer periods of storage, about 1% to 10% of the rosin amine based on the weight of the protein material may be desired. However, for most purposes about 1% of the rosin amine is sufficient.

What I claim and desire to protect by Letters Patent is:

1. An aqueous solution or dispersion of an alkali proteinate containing a preservative for said proteinate selected from the group consisting of a stabilized rosin amine and the salts thereof in an amount within the range of about 0.25% and about 10% of the weight of said proteinate.

2. An aqueous solution or dispersion of an alkali proteinate containing a preservative for said proteinate selected from the group consisting of dehydrogenated rosin amine and the salts thereof in an amount within the range of about 0.25% and about 10% of the weight of said proteinate.

3. An aqueous solution or dispersion of an alkali caseinate containing a preservative for said caseinate selected from the group consisting of dehydrogenated rosin amine and the salts thereof in an amount within the range of about 0.25% and about 10% of the weight of said casinate.

4. An aqueous solution or dispersion of an alkali caseinate containing as a preservative for said caseinate dehydrogenated rosin amine in an amount within the range of about 0.25% and about 10% of the weight of said caseinate.

5. An aqueous solution or dispersion of an alkali caseinate containing as a preservative for said caseinate a salt of dehydrogenated rosin amine in an amount within the range of about 0.25% and about 10% of the weight of said caseinate.

6. An aqueous solution or dispersion of an alkali caseinate containing as a preservative for said caseinate hydrogenated rosin amine in an amount within the range of about 0.25% and about 10% of the weight of said caseinate.

7. An aqueous alkali caseinate paint containing as a preservative for the caseinate therein dehydrogenated rosin amine in an amount within the range of about 0.25% and about 10% of the weight of said caseinate.

8. An aqueous alkali caseinate paint containing as a preservative for the caseinate therein a salt of dehydrogenated rosin amine in an amount within the range of about 0.25% and about 10% of the weight of said caseinate.

REGINALD W. IVETT.

REFERENCES CITED

The following references are of record in the file of this patent:

UNITED STATES PATENTS

| Number | Name | Date |
|---|---|---|
| 2,401,675 | Ware | June 4, 1946 |

FOREIGN PATENTS

| Number | Country | Date |
|---|---|---|
| 115,770 | Australia | Sept. 3, 1942 |

OTHER REFERENCES

Soap and Sanitary Chemicals, December 1947, pages 147, 149, and 167.